Dec. 3, 1968   M. R. McELROY   3,414,718
COUNTING CIRCUIT
Original Filed Feb. 17, 1961   3 Sheets-Sheet 1

Melvin R. McElroy,
INVENTOR.
BY.

AGENT.

Melvin R. McElroy,
INVENTOR.

BY.

*Ernest L. Oberlin*

AGENT.

Melvin R. McElroy,
INVENTOR.

United States Patent Office

3,414,718
Patented Dec. 3, 1968

3,414,718
COUNTING CIRCUIT
Melvin R. McElroy, Redondo Beach, Calif., assignor to Hughes Aircraft Company, Culver City, Calif., a corporation of Delaware
Continuation of application Ser. No. 89,949, Feb. 17, 1961. This application Dec. 16, 1964, Ser. No. 421,743
24 Claims. (Cl. 235—92)

ABSTRACT OF THE DISCLOSURE

A numerical control positioning system employing a basic unidirectional counter which is programmed by a tape for driving a positioning servo. The unidirectional counter is included which contains the increments of travel that a machine tool must make before it reaches its predetermined position. A storage device is included for accepting a limited number of "wrong-way" pulses and provides the capability of accounting for these pulses without introducing error into the counting process. When one train of pulses is selected as "right-way" pulses, the occurrence of pulses which are indicated as "wrong-way" pulses in the other train, the other train of pulses inhibits counting of "right-way" pulses for as many "wrong-way" pulses as may occur.

*Background of the invention*

This application is a continuation of Ser. No. 89,949, filed Feb. 17, 1961, now abandoned.

This invention relates generally to binary counter circuits and more particularly to binary counter circuits which are capable of counting up or counting down in response to certain control stimuli applied thereto.

Digital computer and control systems often require the use of counting registers or counters which respond to the number of pulses in a pulse train and which will either count up or count down in accordance with said pulses. In many cases it is necessary to provide a counter which will distinguish two species of input pulses to count up when a pulse of a first species is received and to count down when a pulse of a second species is received.

For example, if the motion of a mechanical element is represented by a train of pulses it is possible that, during motion, mechanical transients or vibrations may occur which will move the mechanical element in a direction opposite to the desired direction of motion. If the counter is to represent the actual position of the mechanical element, these motions in the unwanted direction, which will be called "wrong-way" motions, will generate "wrong-way" pulses which must be distinguishable from the "right-way" pulses generated by motion in the desired direction, and must cause the counter to count in the opposite direction than "right-way" pulses. The generation of pulses which depend, in kind, upon the direction of motion of a mechanical element has been accomplished and is well known in the art.

Many counters have been devised which will either count up or count down in response to two unique species of pulses as described above. Such a counter has been described in Patent No. 2,816,226, issued Dec. 10, 1957, inventors C. B. Forrest et al. However, the use of a bi-directional counter in a device which uses bistable elements connected to form a counting register poses some disadvantages over a unidirectional counter. First, a bidirectional counter requires more complex circuitry associated with each of the bistable elements making up the register. Further, it is generally difficult to enter information serially into each element of a bidirectional counter. A unidirectional counter is a simpler device which does not require the control of the order of resetting its constituent bistable elements.

*Summary of the invention*

The present invention provides, in a basic undirectional counter, means for accepting a limited number of "wrong-way" pulses and provides the capability of accounting for these pulses without introducing errors into the counting process. In many cases, such as the mechanical motions described above, it is not necessary to provide a complete bidirectional counting facility since by far the greater part of the pulses received will require a count in a particular direction and only the exceptional or "wrong-way" pulses will require special treatment. The present invention provides a relatively inexpensive and simple device which operates in the manner described.

Accordingly, one object of the present invention is to provide a counter which can accept a limited number of "wrong-way" counts.

A further object of this invention is to provide a counter adapted to perform a series of counting operations and provided with means for preventing error caused by pulse occurrences in the interim between one counting operation and the next.

A still further object of this invention is to provide a counter suitable for use in connection with a moving element to determine the position of said element while correcting for both the effects of "wrong-way" movements of the element and for overshoot of the element from its desired stopping place.

Another object of this invention is to provide a counter suitable for use in connection with an element capable of movement in either of two opposite directions to determine the position of said element while correcting for both the effects of "wrong-way" movements of the element and for overshoot of the element from its desired stopping place while permitting the selection of either direction of movement of said element as the "right-way" direction.

*Description of the figures*

The above mentioned and other features and objects of this invention and the manner of obtaining them will become more apparent by reference to the following description taken in conjunction with the accompanying drawings wherein.

*Detailed description of preferred embodiments of this invention*

Figure 1A:
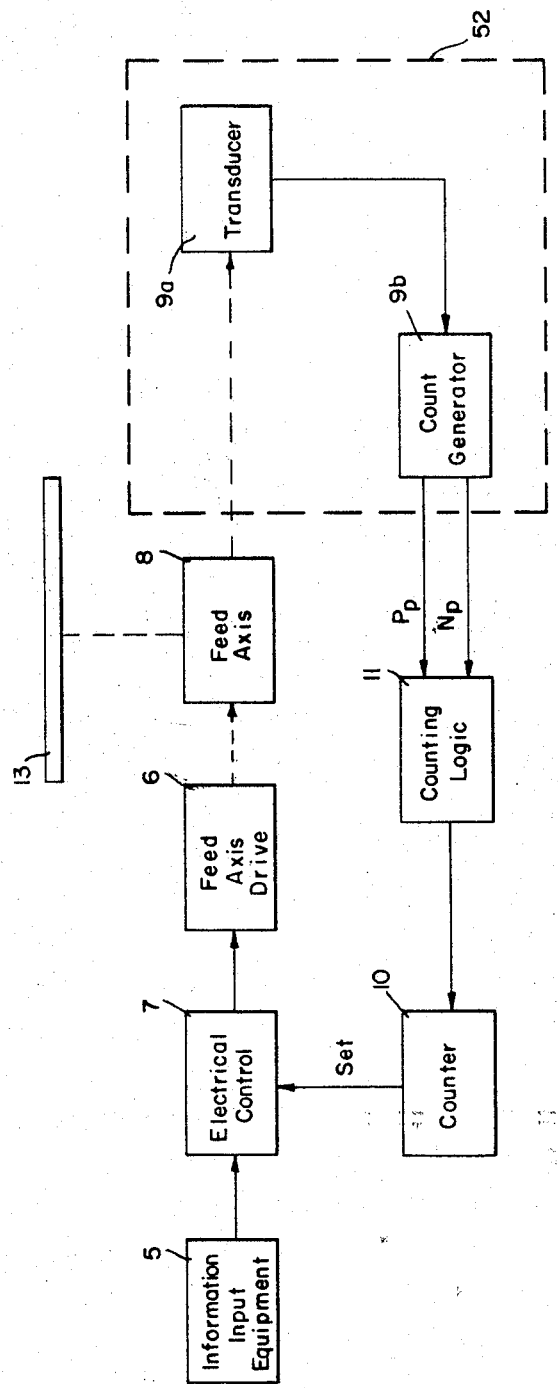
FIG. 1a is a schematic diagram showing an embodiment of this invention used with a movable element.

Turning now to a more detailed description of this invention, there is shown in FIG. 1a a schematic block diagram of a movable element which may be, for example, a machine tool which may be used in combination with the disclosed count circuit. Information input equipment 5, which may include any suitable type of discrete signal program such as a punched paper tape, or the like, presents desired move data to an electrical control 7 which performs various operations to machines tool circuits, one of which is to enable a feed axis drive 6 and place a count in a counter 10 to indicate total direction in a desired machine axis. A physical movement is generated from feed axis drive 6 to a feed axis 8. The movement of feed axis 8 and the machine tool coupled therewith is sensed by a transducer 9a and provides output signals in the form of square wave voltages or increment pulses. The output lead of transducer 9a is coupled into a count generator 9b which develops the counts $P_p$ and $N_p$ in accordance with the movement of feed axis 8 and a movable element 13 which may be in the form of a machine tool worktable or the like which may be coupled thereto. Transducer 9a and count generator 9b form a pulse source 52. Feed axis 8 is capable of moving movable element 13 on a machine axis either in an X or Y direction from a fixed zero point and an incrementing means as defined in Patent No. 3,262,105 as previously mentioned, as an example, provides input signals to pulse source 52, which in turn provides $P_p$ pulse (right-way pulses) on output lead 54 and $N_p$ pulses (wrong-way pulses) on output lead 56 which is coupled to counting logic which controls counter 10, as will be described in relation to FIGS. 1b, 2, 3 and 4.

Figure 1B:
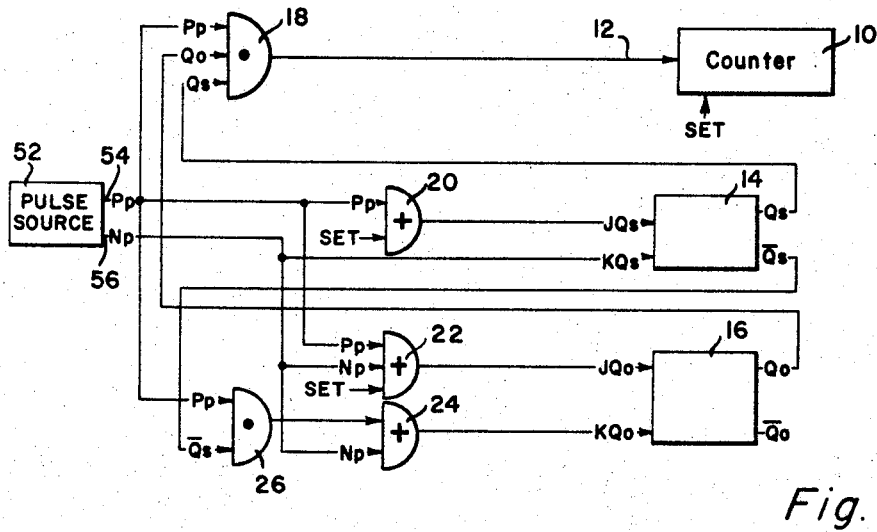
FIG. 1b is a schematic diagram showing an embodiment of a counting circuit capable of accepting two successive "wrong-way" pulses.

Turning now to FIG. 1b, there is shown a schematic diagram illustrating an embodiment of the present invention. The embodiment of FIG. 1b is capable of accepting two successive "wrong-way" pulses in a pulse train of "right-way" pulses. In addition, after an interval of "right-way" pulses, the counter will again accept two successive "wrong-way" pulses without producing an error in the count. In FIG. 1b, there is shown in block form a counter 10 which may be a unidirectional counter comprising a plurality of bistable elements or flip-flops suitably interconnected. Such counting registers are extremely well known in the art, and an example of such a counter may be found in Patent No. 2,644,887, issued July 7, 1953, inventor A. E. Wolfe, Jr.

As may be seen in the reference, such a counter is interconnected such that the output terminals of the flip-flops comprising the counter register assume a unique voltage configuration for each different number of input pulses received by the counter 10. The counter 10 is adapted to receive pulses from an input terminal 12. Since the counter is unidirectional, it is necessary that only pulses of a first species, i.e., "right-way" pulses, be supplied to the input terminal 12. However, assume that the pulse train which is desired to be counted comprises both "right-way" pulses $P_p$ and occasional "wrong-way" pulses $N_p$ and further assume that the "right-way" pulses $P_p$ and the "wrong-way" pulses $N_p$ will appear at different outputs of pulse generating equipment at different times.

Pulse generating equipment which provides "right-way" pulses $P_p$ and "wrong-way" pulses $N_p$, as described above, has been shown in co-pending patent application Ser. No. 80,485, for a Condition Responsive Electrical System, inventor Raymond C. Bell, filed Jan. 3, 1961, now Patent No. 3,262,105 said invention assigned to Hughes Aircraft Company, the assignee of the present invention.

The present invention operates by introducing the "right-way" pulses $P_p$ to the input 12 of the counter 10. At all times when such pulses occur, unless correction is to be made for the fact that $N_p$ pulses have occurred, basically the $P_p$ pulse train is introduced directly to the input terminal 12.

The controls necessary to provide for the acceptance of "wrong-way" pulses, are provided by two flip-flops 14 and 16.

It should be assumed hereinafter that in all of the description which follows, a flip-flop will be of the type which has two input terminals and two output terminals. The input terminals will be designated JQ and KQ and the output terminals will be designated Q, the "true" output terminal, and $\overline{Q}$, the "false" output terminal. It is to be further understood that a pulse occurring on the JQ input of the flip-flop will set the flip-flop into a condition in which the Q output of the flip-flop has a relatively high voltage and the $\overline{Q}$ output of the flip-flop has a relatively low voltage. Also, a pulse appearing at the KQ input of the flip-flop will set the flip-flop into a condition in which the Q output assumes a relatively low voltage and the $\overline{Q}$ output assumes a relatively high voltage. Pulses appearing simultaneously at the JQ and KQ inputs of the flip-flop will cause the flip-flop to change state, that is, if the Q output of the flip-flop is high and the $\overline{Q}$ output is low the occurrence of simultaneous pulses will cause a reversal of this condition so that the Q output will be low and the $\overline{Q}$ output high. Conversely if the Q output is low and the $\overline{Q}$ output is high simultaneous occurrence of the pulses at both inputs will cause the Q output to go high and the $\overline{Q}$ output low.

It should also be pointed out that a relatively high voltage appearing at the Q output and a simultaneous relatively low voltage appearing at the $\overline{Q}$ output, will be designated the "true" state; also a relatively high voltage appearing at the $\overline{Q}$ output and a simultaneous relatively low voltage appearing at the Q output will be designated the "false" state of the flip-flop.

The figures describing the present invention include reference to AND and OR gates. Such gates are well known in the art. However, an example of such gating using diodes as the principal gating elements is shown in U.S. Patent No. 2,762,936, issued Sept. 11, 1956 to R. D. Forrest.

Since it is desired to pass "right-way" pulses, $P_p$ only when the "true" outputs of both flip-flops 14 and 16, $Qs$ and $Qo$ are simultaneously high at the occurrence of a $P_p$ pulse, the three signals $P_p$, $Qo$ and $Qs$ are supplied to the input terminal of an AND gate 18. The output of the AND gate 18 is connected to the input terminal 12 of the counter 10.

It is now necessary to indicate the operation of the flip-flops 14 and 16 whose operation controls the passage of "right-way" pulses $P_p$ in such a way that when "wrong-way" pulses $N_p$ occur, the passage of "right-way" pulses will be inhibited so that the counter assumes the proper configuration. It is evident that each occurrence of a "wrong-way" pulse $N_p$ must cause the inhibition of a "right-way" pulse, $P_p$, if the counter 10 is to maintain its accuracy.

The flip-flops 14 and 16 are connected to form a control element which in itself is a simple form of counter. Assume that at the start of a counting operation, a signal which will be called "Set" will set both the flip-flops 14 and 16 into a "true" state, that is, both $Qs$ and $Qo$ will be high. Thus, the first pulse $P_p$ which is received will be passed to the counter and will result in a count being recorded by the counter. Thereafter "right-way" pulses $P_p$ will continue to be applied to the counter 10 as long as both the flip-flops 14 and 16 are maintained with their outputs $Qs$ and $Qo$ in a high state. Thus, until a "wrong-way" pulse $N_p$ is received, each "right-way" pulse $P_p$ continues to be supplied to the counter 10.

If an $N_p$ pulse should occur, both flip-flops 14 and 16 will be set to a "false" condition, that is, the outputs $\overline{Q}s$ and $\overline{Q}o$ will be high. Thus, the next $P_p$ pulse will not be supplied to the counter 10 and a count will be missed as desired. However, this $P_p$ pulse will reset both of the flip-flops 14 and 16 and the following $P_p$ pulse will be supplied to the counter 10. Effectively, the "wrong-way" pulse $N_p$ has cancelled one "right-way" $P_p$ pulse and since neither reaches the counter, no error is made.

If two successive "wrong-way" pulses, $N_p$, occur, the first sets the flip-flops 14 and 16 to a "false" condition, the second sets $Qo$ high while $Qs$ remains set low. The next "right-way" pulse $P_p$ sets $Qo$ low and $Qs$ high. The following "right-way" pulse sets $Qo$ high while $Qs$ remains high. Thus, neither of these first two $P_p$ pulses is supplied to the counter. Since, at this point, the flip-flops 14 and 16 are set high or to a "true" condition, the next "right-way" pulse $P_p$ will be counted. Thus, two "wrong-way" pulses $N_p$ have cancelled two "right-way" pulses $P_p$ and no error in counting will result.

The flip-flops 14 and 16 along with associated gating circuitry form the control element which inhibits the passage of "right-way" pulses $P_p$ as required to maintain counting accuracy. The associated gating circuitry is shown in FIG. 1b and comprises an OR gate 20 having a first input terminal connected to the "right-way," $P_p$, pulse source, terminal 54 of pulse source 52, and a second input terminal connected to a pulse source which is adapted to provide a signal when a counting operation is to be initiated. This signal which will be called "Set" is also used to reset the counter 10 to a desired initial configuration. The output of the OR gate 20 is connected to the JQs input of the flip-flop 14. The KQs input is connected to the "wrong-way," $N_p$, pulse source, terminal 56 of pulse source 52. The flip-flop 16 is controlled by an OR gate 22 having a first input terminal connected to the $P_p$ pulse source, a second input terminal connected to the $N_p$ pulse source and a third input terminal connected to the "Set" pulse source. The output of the OR gate 22 is connected to the JQo input terminal of the flip-flop 16. The KQo input terminal of the flip-flop 16 is connected to the output of an OR gate 24 which has in turn a first input terminal connected to the $N_p$ pulse source and a second input terminal connected to the output terminal of an AND gate 26. The AND gate 26 has a first input terminal connected to the $P_p$ pulse source and a second input terminal connected to the "false" output terminal of the flip-flop 14, $\overline{Q}s$.

The following equations define the "Count" signal which will be the pulse train which is supplied to the input terminal 12 of the counter 10 and the input signals to the flip-flops 14 and 16:

"Count" $= P_p \cdot Qo \cdot Qs$
$JQs = P_p +$ "Set"
$KQs = N_p$
$JQo = P_p + N_p +$ "Set"
$KQo = N_p + P_p \cdot Qs$ in which "Count" is the series of pulses forming the input to the counter 10,
JQs is the "true" input signal to the flip-flop 14,
KQs is the "false" input signal to the flip-flop 14,
JQo is the "true" input signal to the flip-flop 16,
KQo is the "false" input signal to the flip-flop 16,
$P_p$ is the "right-way" pulse train,
$N_p$ is the "wrong-way" pulse train,
Qs is the "true" output of the flip-flop 14,
$\overline{Q}s$ is the "false" output of the flip-flop 14,
$Q_o$ is the "true" output of the flip-flop 16,
$\overline{Q}o$ is the "false" output of the flip-flop 16,
"Set" is a signal indicating that a count operation is to be initiated.

The "Count" signal, which has already been defined, may be seen from the equations to conform to the requirements previously set out, i.e., that a count can only be permitted when at the time of occurrence of a "right-way" pulse $P_p$, both the control flip-flops 14 and 16 are simultaneously in a "true" or high condition. The control requirements are also met since it can also be seen that the flip-flop 14 will be set high on the occurrence of a $P_p$ pulse and will be set low on the occurrence of an $N_p$ pulse. Further, if a "Set" signal is supplied it will also set the flip-flop 14 to a high condition. The flip-flop 16 will be set high by the occurrence of either a $P_p$, $N_p$, or "Set" pulse and will be set low on the occurrence of an $N_p$ pulse or on the simultaneous occurrence of a $P_p$ pulse with a "false" condition of the flip-flop 14, $\overline{Q}s$.

Figure 2:
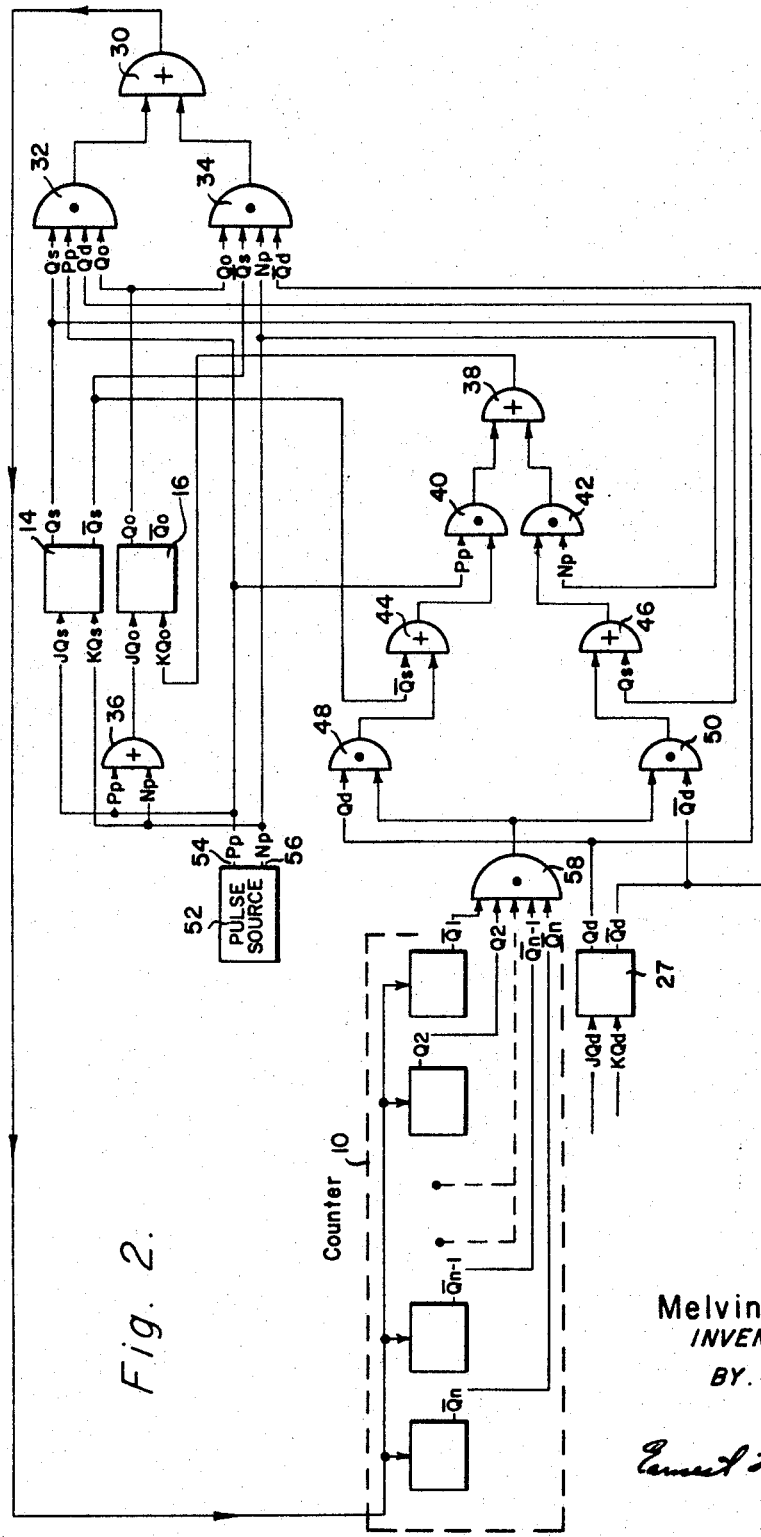
FIG. 2 is a schematic diagram of an embodiment of the present invention including provisions for the acceptance of overshoot pulses and for the establishment of either direction of motion of an associated moving element as the "right-way" direction.

FIG. 2 shows a schematic diagram of an electrical circuit which provides the compensation feature for "wrong-way" pulses already described and which includes other important features of the present invention. These features include what has been called "overshoot" capability and "count direction choice."

When the counter forming the subject of the present invention is used in a system such as in combination with apparatus for providing controlled mechanical motion of an element coupled to feed axis 8, as shown in FIG. 1a, the features mentioned above become most desirable. Should the moving element, whose motion in effect generates the $P_p$ and $N_p$ pulse trains, fail to stop quickly enough when the counting register is reset to its initial condition, an extra pulse may be generated. This generation of an additional pulse when the counter is unable to accept such a pulse provides the possibility of an error appearing in a subsequent operation. This invention lends itself readily to the storage of such an extra pulse and the consequent correction of such an error.

In addition, it is frequently necessary to provide for the ability to choose either direction of motion of a mechanical element coupled to the feed axis 8, as shown in FIG. 1a, having capability of motion in either of two opposite directions, as the "right-way" direction.

To provide these capabilities some changes and additions to the circuit shown in FIG. 1b are required. When counting register 10 such as the subject of the present invention is used in connection with the control of a moving element, counting register 10 may be initially set to a value representing a dimension. As the moving element advances to the desired dimension and detected by transducer 9, as shown in FIG. 1b, counting register 10 counts down to a fixed value such as "zero" at which point motion of the element must be stopped by disabling feed axis drive 6 through electrical control 7. Since moving elements are generally capable of motion in either of two opposite directions, it is usually necessary that either direction of motion be capable of being designated the "right-way" direction, and, as discussed above, it is generally necessary that overshoot and undershoot of the "zero" position not introduce errors into the system.

It should be first pointed out that a directional flip-flop 27 indicating the desired or "right-way" direction of motion must be added. In the present invention, if the "true" output of flip-flop 27 is high, Qd, the $P_p$ pulses will be "right-way" pulses and if the "false" output of the flip-flop 27 is high, $\overline{Q}d$, $N_p$ pulses will be "right-way" pulses. Thus, the "Count" signal must now provide for two contingencies. First, if Qd is high a "Count" signal must be provided upon the simultaneous occurrence of high voltages on the Qo and Qs outputs of flip-flops 14 and 16 at the time of generation of a $P_p$ pulse. On the other hand when $\overline{Q}d$ is high the simultaneous occurrence of an $N_p$ pulse, along with high voltages, on the Qo and $\overline{Q}s$ outputs of the flip-flops 14 and 16 must occur.

The control flip-flops 14 and 16 are not set when a new number is entered in counting register 10. In order to compensate for an overshoot, it is necessary to establish as a "zero" level a counting register reading 00 . . . 01. In addition, it is necessary to provide that the signal which effectively zeros the register also sets the flip-flop 16 to a "false" condition. In the embodiment shown in FIG. 2, the signal which effectively zeros the register is either a $P_p$ or $N_p$ pulse depending upon the "right-way" direction of motion. Accordingly, when the counting register is in a 00 . . . 02 state, it is this pulse which will force the counting register into the zero state, i.e., 00 . . . 01 and which also must be made to set the flip-flop 16 to a "false" state. If the $P_p$ pulses have been chosen to be the "right-way" pulses, a count signal can only be provided when both the flip-flops 14 and 16 are simultaneously in a "true" state. It is evident that at the beginning of the next counting operation, the first $P_p$ pulse will not provide a "Count" signal but will set both the flip-flops 14 and 16 to a "true" state. Thus, a "Count"

will be missed. However, as stated above, setting the zero state of the register to 00 . . . 01 effectively compensates for this loss of a $P_p$ pulse.

However, if, while the counting register is being reset, an additional $P_p$ pulse is received, the fact that the counting register can not accept the "Count" will not prevent the flip-flops 14 and 16 from being set to a "true" state by the additional $P_p$ pulse and in this event the first $P_p$ pulse will be counted. Thus, the overshoot is compensated for, by effectively counting the first $P_p$ pulse twice. An undershoot, that is, a "wrong-way" pulse received during resetting of a counter, is also compensated for by the fact that the additional "wrong-way" pulse will set the flip-flop 14 to a "false" condition and the flip-flop 16 to a "true" condition. Thus, the first $P_p$ pulse received will set the flip-flop 14 to a "true" condition and will set the flip-flop 16 to a "false" condition. The second $P_p$ pulse will set the flip-flop 16 to a "true" condition. Since both flip-flops 14 and 16 are then in a "true" state, the third $P_p$ pulse will be counted. It is evident then that effectively one $P_p$ pulse which should have been counted will be ignored and that the undershoot has been corrected.

Similarly, if the $N_p$ pulses have been chosen to be the "right-way" pulses, the operation already described is identical with the exception that it is now necessary to reverse the sense of the outputs of flip-flop 14, $Qs$ and $\overline{Q}s$, since each $N_p$ pulse sets the flip-flop 14 into a "false" condition rather than into the "true" condition described when the $P_p$ pulses were the "right-way" pulses. The equations given below describe the operaton as stated about:

Count=$P_p \cdot Qd \cdot Qo \cdot Qs + N_p \cdot \overline{Q}d \cdot Qo \cdot Qs$,
$JQs = P_p$
$KQs = N_p$
$JQo = P_p + N_p$
$KQo = P_p(\overline{Q}s +$ "00 . . . 02"$\cdot Qd)$
$\qquad + N_p(Qs +$ "00 . . . 02"$\cdot \overline{Q}d)$ in which the definitions given in connection with the equations describing the operation of the embodiment of FIG. 1 apply here and $JQd$ is the "true" input signal to the flip-flop 27.
$KQd$ is the "false" input signal to the flip-flop 27.

The details of construction of the embodiment of FIG. 2 will be described below.

The "Count" signal is provided by an OR gate 30 whose output is connected to the input of the counter 10, said OR gate having two input terminals each respectively connected to the output terminals of AND gates 32 and 34. Each of the AND gates 32 and 34 is equipped with four input terminals. The AND gate 32 has a first input terminal connected to the source of "right-way" pulses $P_p$, a second input terminal connected to the "true" output terminal of the flip-flop 27, a third input terminal connected to the "true" output terminal of the flip-flop 16 and a fourth input terminal connected to the "true" output terminal of the flip-flop 14. The AND gate 34 has a first input terminal connected to the source of "wrong-way" pulses $N_n$, a second input terminal connected to the "false" output terminal of the flip-flop 27, a third input terminal connected to the "true" output terminal of the flip-flop 16 and a fourth input terminal connected to the "false" output terminal of the flip-flop 14. Thus, the "Count" signal fulfills the requirements stated above and shown in the logical equations supplied.

As already described in connection with FIG. 1b, the flip-flops 14 and 16, along with associated gating circuitry, form the control element which inhibits the passage of "right-way" pulses, $P_p$, as required to maintain counting accuracy.

The flip-flop 14 has its "true" input terminal connected to the source of "right-way" pulses, $P_p$, and its "false" input terminal connected to the source of "wrong-way" pulses, $N_p$. The flip-flop 16 is provided with associated gating circuitry as described above. This associated gating circuitry comprises an OR gate 36 having its output terminal connected to the "true" input terminal $JQo$ of the flip-flop 16 and having two input terminals. The first input terminal of the OR gate 36 is connected to the source of "right-way" pulses $P_p$ and the second input terminal is connected to the source of "wrong-way" pulses, $N_p$.

An OR gate 38 has its output terminal connected to the "false" input terminal $KQo$ of the flip-flop 16. The OR gate 38 has two input terminals connected respectively to output terminal of AND gates 40 and 42. The AND gate 40 has two input terminals. The first input terminal is connected to the source of "right-way" pulses $P_p$ and the second input terminal is connected to the output terminal of an OR gate 44. The AND gate 42 has two input terminals. The first input terminal is connected to the source of "wrong-way" pulses, $N_p$, and the second input terminal is connected to the output terminal of an OR gate 46. The OR gate 44 has two input terminals. The first input terminal is connected to the "false" output terminal of the flip-flop 14 and the second input terminal is connected to the output terminal of an AND gate 48. The OR gate 46 has two input terminals. The first input terminal is connected to the "true" output terminal of the flip-flop 14 and the second input terminal is connected to the output terminal of an AND gate 50. The AND gate 48 has two input terminals. The first input terminal is connected to the "true" output terminal of the directional flip-flop 27 and the second input terminal is connected to the signal "00 . . . 02," provided at the output of an AND gate 58, whose generation will be described below. The AND gate 50 has two input terminals. The first input terminal is connected to the "false" output terminal of the directional flip-flop 27 and the second input terminal is connected to the signal "00 . . . 02."

In the description given above, a pulse source 52 having two output terminals supplies the separately existing pulse trains $P_p$ and $N_p$ as desired. Thus, an output terminal 54 provides "right-way" pulses, $P_p$, and a second output terminal 56 provides "wrong-way" pulses, $N_p$. In the preceding description whenever the pulse train $P_p$ is supplied it will be assumed that an electrical connection is made to the terminal 54, and whenever the pulse train $N_p$ is supplied it will be assumed that an electrical connection has been made to the terminal 56.

The flip-flop 27 has already been described as indicating whether the $P_p$ pulses will be "right-way" pulses or "wrong-way" pulses. It is evident that this flip-flop can be controlled either manually by use of a switch or automatically by use of a recorded signal such as a magnetic or punched paper tape.

The generation of the "00 . . . 02" signal will now be described. Assuming that the counter 10 comprises a plurality of flip-flops interconnected as shown by the reference given heretofore, an AND gate may be used to indicate the "00 . . . 02" state of the counter 10 as shown in FIG. 2. Designating the flip-flops making up the counter 10 as Q1, Q2, . . . Q$n$–1, Q$n$, the signal "00 . . . 02" is obtained by providing an AND gate 58 having as many input terminals as there are flip-flops in the counter and by connecting to these inputs to the AND gate, the "false" output terminal of each of said flip-flops except the "false" output terminal of the flip-flop Q2 which registers the next least significant digit. With regard to the flip-flop Q2, the "true" output terminal is connected to the remaining input terminal of the AND gate 58. The output terminal of the AND gate 58 provides the "00 . . . 02" signal as desired and must be connected to the gating circuits where such a connection has been indicated.

Figure 3:
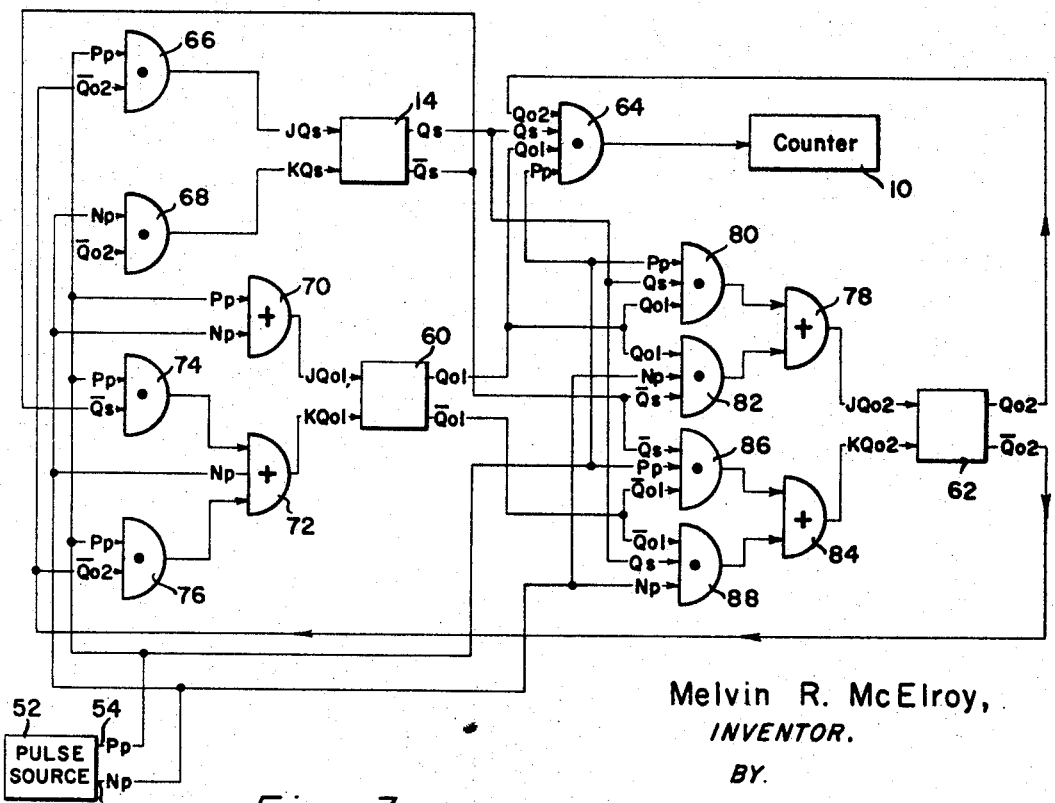
FIG. 3 is a schematic diagram of an embodiment of the present invention which provides for the acceptance of up to six successive "wrong-way" pulses.

Turning now to FIG. 3, an embodiment of the present invention is shown which will accept and compensate for up to six "wrong-way" counts. To accomplish this purpose, the flip-flop 16 has been replaced with two flip-flops 60 and 62. The embodiment of FIG. 3 works in similar fashion to the embodiments of FIG. 1 and FIG. 2 except that the concurrence of high voltages at the "true" output terminals of the flip-flops 14, 60 and 62, along with the occurrence of a "right-way" pulse, $P_p$, are required to provide a signal causing the counter 10 to count. The flip-flop 14 functions in the same fashion as described in connection with FIG. 1 except that in the event the "false" output terminal of the flip-flop 62 is high there must be no change of state of the flip-flop 14 caused by either "wrong-way" or "right-way" pulses, $P_p$ or $N_p$.

The flip-flops 60 and 62 are connected to form a simple binary counting circuit having complete bidirectional counting facility. The flip-flop 60 will be set to a "true" condition $Qo1$ high, when either a "right-way" pulse $P_p$, or a "wrong-way" pulse, $N_p$, occurs and the flip-flop 60 is in a "false" condition, $\overline{Q}o1$. The flip-flop 60 will be set to a "false" condition when it is in a "true" condition and either an $N_p$ pulse is received or a $P_p$ pulse is received simultaneously with either the occurrence of a $\overline{Q}s$ condition of the flip-flop 14 or a $\overline{Q}o2$ condition of the flip-flop 62. The flip-flop 62 will be set to a "true" condition, $Qo2$, when it is in a "false" condition and when either a positive pulse is supplied to its "true" input terminal simultaneously with the occurrence of $Qs$ and $Qo1$ or when a "wrong-way," $N_p$, pulse is received simultaneously with the occurrence of $\overline{Q}s$ and $Qo1$. The flip-flop 62 will be set to a "false" condition, $\overline{Q}o2$, when it is in a "true" condition and on the occurrence of either a "right-way" pulse simultaneously with the $\overline{Q}s$ and $\overline{Q}o1$ states or the occurrence of a "wrong-way" pulse, $N_p$, simultaneously with the occurrence of the $Qs$ and $\overline{Q}o1$ states.

The existence of the $\overline{Q}o2$ terms in the switching logic is explained by the fact that the counter formed by flip-flops 14, 60, and 62 is slightly anomalous in that the counter is not operating in conventional binary fashion. Rather, the output of flip-flop 14 is to be regarded as a sign digit and a "true" condition, $Qs$, indicates a plus sign and a "false" condition, $\overline{Q}s$, indicates a minus sign. This type of operation, which is illustrated as a preferred embodiment of the present invention, was chosen because of its compatibility with a system for controlling a moving member. However, the counter formed by flip-flops 14, 60, and 62 could equally well have been made to operate in conventional binary fashion. Because of the somewhat special operation desired, however, some switching terms presently incorporated into the embodiment of FIG. 3 were necessary. Any difficulty in comprehending the nature and use of such switching terms may be resolved by reference to a conventional "truth" table such as is generally used in the explanation of the operation of devices utilizing binary operation.

The equations given below describe the operation of the embodiment of FIG. 3.

$$\text{Count} = P_p \cdot Qs \cdot Qo1 \cdot Qo2$$
$$JQs = P_p \cdot \overline{Q}o2$$
$$KQs = N_p \cdot \overline{Q}o2$$
$$JQo1 = P_p \cdot + N_p$$
$$KQo1 = P_p(\overline{Q}s + \overline{Q}o2) + N_p$$
$$JQo2 = P_p \cdot Qs \cdot Qo1 + N_p \cdot \overline{Q}s \cdot Qo1$$
$$KQo2 = P_p \cdot \overline{Q}s \cdot \overline{Q}o1 + N_p \cdot Qs \cdot \overline{Q}o1$$

in which the definitions given in connection with the equations describing the operation of the embodiments of FIG. 1b and FIG. 2 apply here and $JQo1$ is the "true" input signal to the flip-flop 60.
$KQo1$ is the "false" input signal to the flip-flop 60.
$JQo2$ is the "true" input signal to the flip-flop 62.
$KQo2$ is the "false" input signal to the flip-flop 62.

The details of construction of the embodiment of FIG. 3 will be described below.

In the embodiment of FIG. 3, an AND gate 64 has its output terminal connected to the output terminal of the counter 10. The AND gate 64 is furnished with four input terminals which are connected respectively to a source of "right-way" pulses, $P_p$, the "true" output terminal of the flip-flop 14, and the "true" output terminals of the flip-flops 60 and 62. The output of the AND gate 64 supplies the "Count" signal to the counter 10.

The flip-flop 14 has its "true" input terminal connected to the output terminal of an AND gate 66. The AND gate 66 has two input terminals, one of which is connected to the source of "right-way" pulses, $P_p$, and the other connected to the "false" output terminal of the flip-flop 62, $\overline{Q}o2$. The "false" input terminal of the flip-flop 14 is connected to the output terminal of an AND gate 68 which has two input terminals. The first input terminal of the AND gate 68 is connected to the source of "wrong-way" pulses, $N_p$, and the second input terminal is connected to the "false" output terminal of the flip-flop 62.

The flip-flop 60 has its "true" input terminal connected to the output of an OR gate 70 which has its two input terminals connected respectively to the source of "right-way" pulses, $P_p$, and the source of "wrong-way" pulses, $N_p$. The "false" input terminal of the flip-flop 60 is connected to the output terminal of an OR gate 72 which has three input terminals. The first input terminal of the OR gate 72 is connected to an output terminal of an AND gate 74. The AND gate 74 has two input terminals connected respectively to the source of "right-way" pulses and to the "false" output terminal of the flip-flop 14. The second input terminal of the AND gate 72 is connected to the output terminal of an AND gate 76 which has two input terminals connected respectively to the source of "right-way" pulses, $P_p$, and to the "false" output terminal of the flip-flop 62. The third input terminal of the OR gate 72 is connected to the source of "wrong-way" pulses, $N_p$.

The "true" input terminal of the flip-flop 62 is connected to the output terminal of an OR gate 78 having two input terminals connected respectively to an AND gate 80 at a second AND gate 82. The AND gate 80 has three input terminals connected respectively to the source of "right-way" pulses, $P_p$, the "true" output terminal of the flip-flop 14, and the "true" output terminal of the flip-flop 60. The AND gate 82 has three input terminals connected respectively to the source of "wrong-way" pulses, $N_p$, the "false" output terminal of the flip-flop 14 and the "true" output terminal of the flip-flop 60. The "false" input terminal of the flip-flop 62 is connected to the output terminal of an OR gate 84 which has two input terminals connected respectively to the output terminals of AND gates 86 and 88. The AND gate 86 has three input terminals connected respectively to the source of "right-way" pulses, $P_p$, the "false" output terminal of the flip-flop 14, and the "false" output terminal of the flip-flop 60. The AND gate 88 has three input terminals connected respectively to the source of "wrong-way" pulses, $N_p$, the "true" output terminal of the flip-flop 14, and the "false" output terminal of the flip-flop 60.

In the description given above, a pulse sources 52 having two output terminals supplies the pulse trains $P_p$ and $N_p$ as desired. Thus, an output terminal 54 provides "right-way" pulses $P_p$, and a second output terminal 56 provides "wrong-way" pulses, $N_p$. In the preceding description whenever the pulse train $P_p$ was supplied it will be assumed that an electrical connection is made to the terminal 54, and whenever the pulse train $N_p$ was supplied it will be assumed that an electrical connection was made to the terminal 56.

Although specific embodiments of the present invention have been shown, it should be understood that other embodiments utilizing the principles of the present invention may be constructed without deviation from the principles taught in the present description. Accordingly, what is claimed is:

1. A counter arrangement for applying first electrical control pulses provided by a pulse source which also occasionally produces second electrical control pulses wherein means are provided for eliminating the effect of said second electrical control pulses by eliminating the counting of one of said first electrical control pulses for each second electrical control pulse, said means comprising:

a unidirectional counter;

gating means coupled to said pulse source and to said counter for coupling said first electrical control pulses to said unidirectional counter;

at least two control flip-flops;

circuit means including gates coupled to one of said two control flip-flops and to said pulse source for coupling said one control flip-flop to said pulse source to be set in a first electrical state in response to said first electrical control pulses and to be set in a second electrical state in response to said second electrical control pulses;

additional gates coupling said one control flip-flop to the other of said two control flip-flops to control said other control flip-flop;

and means coupling the outputs of said two control flip-flops to said gating means for enabling said gating means when said two control flip-flops are in said first electrical state to apply said first electrical control pulses to said unidirectional counter and for disabling said gating means when at least one of said two electrical control flip-flops is in said second electrical state to prevent applying of said first electrical control pulses to said unidirectional counter.

2. A counter arrangement for counting first electrical control pulses provided by a pulse cource which also occasionally produces second electrical control pulses wherein means as provided for eliminating the effect of said second electrical control pulses by eliminating the counting of one of said first electrical control pulses for each second electrical control pulse, said means comprising:

a unidirectional counter;

gating means coupled to said pulse source and to said counter for applying said first electrical control pulses to said unidirectional counter;

a plurality of control flip-flops;

circuit means including input gates coupled to one of said control flip-flops and to said pulse source for setting said one control flip-flop in a first electrical state in response to said first electrical control pulses and in a second electrical state in response to said second electrical control pulses;

additional gates coupling said control flip-flops in cascade with said one control flip-flop as the first control flip-flop so that each control flip-flop is controlled by preceding flip-flops and by said first and second control pulses;

and means coupling the outputs of said plurality of control flip-flops to said gating means for enabling said gating means when said control flip-flops are in said first electrical state to apply said first electrical control pulses to said unidirectional counter and for disabling said gating means when at least one of said plurality of control flip-flops is in said second electrical state to prevent applying of said first electrical control pulses to said unidirectional counter.

3. Apparatus as set forth in claim 2 in which the output of the last flip-flop of said plurality of electrical control flip-flops is additionally coupled to said input gates for enabling said input gates when said last control flip-flop is in a predetermined one of said first and second electrical states.

4. Apparatus as set forth in claim 2 in which the output of the last flip-flop of said plurality of electrical control flip-flops is additionally coupled to said gating means for enabling said input gates when said last control flip-flop is in a predetermined one of said first and second electrical states.

5. A binary counter circuit comprising:

a unidirectional counting register adapted to receive electrical pulses and to provide an indication of the number of pulses received;

first and second sources of electrical pulses;

control signal providing means, coupled to said first and second pulse sources and responsive to pulses therefrom;

and a control element coupled to said register and to one of said pulse sources for inhibiting the passage of pulses from said one pulse source to said register, said control element being coupled to said control signal providing means and adapted to receive control signals therefrom.

6. A binary counter circuit for indicating the position of a moving element capable of moving in either of two directions comprising:

first and second electrical pulse sources, each pulse from said pulse sources indicating an increment of motion of said moving element in one of said directions;

a unidirectional counting register adapted to receive electrical pulses from one of said pulse sources and to provide an indication of the number of pulses received;

control signal providing means coupled to said first and second pulse sources and responsive to pulses therefrom and further coupled to said register and responsive thereto;

a pulse selection signal generator;

and a control element coupled to said register and to said pulse sources for selecting one of said pulse sources and for permitting the passage of certain pulses from said selected pulse source to said register, said control element being coupled to said control signal providing means and to said pulse selection signal generator and adapted to receive signals therefrom.

7. A binary counter circuit for indicating the position of a moving element capable of moving in either of two directions comprising:

first and second electrical pulse sources, each pulse from said pulse sources indicating an increment of motion of said moving element in one of said directions;

a unidirectional counting register comprising a plurality of flip-flops electrically interconnected to form a binary counter and adapted to receive electrical pulses from one of said pulse sources and to provide an indication of the number of pulses received;

control signal providing means comprising first and second control flip-flops and a plurality of AND and OR gates coupled to said flip-flops, said AND and OR gates coupled to said pulse sources and responsive to pulses therefrom for controlling said control flip-flops and a further gate coupled to said plurality of register flip-flops and responsive thereto and coupled to said plurality of AND and OR gates for providing further control of said control flip-flops upon the occurrence of a particular register configuration;

a pulse selection signal generator comprising a flip-flop adapted to indicate one of said electrical pulse sources;

and a control element coupled to said register and to said pulse sources for selecting one of said pulse sources and for permitting the passage of certain pulses from said selected pulse source to said register, said control element being coupled to said control signal providing means and to said pulse selection signal generator and adapted to receive signals therefrom and comprising a plurality of AND and OR gates electrically coupled to said control flip-flops, to said pulse selection signal generator and to said electrical pulse sources and further coupled to said register.

8. A binary counter circuit comprising:

a unidirectional counting register adapted to receive electrical pulses and to provide an indication of the number of pulses received;

first and second sources of electrical pulses;

control signal providing means comprising a bidirectional binary counter circuit coupled to said first and second pulse sources and responsive to pulses therefrom;

a pulse selection signal generator and a control element coupled to said register and to both of said pulse sources for selecting one of said pulse sources and for permitting the passage of said pulses from said selected pulse source to said register, said control element being additionally coupled to said bidirectional counter circuit and to said pulse selection signal generator and adapted to receive signals therefrom.

9. A binary counter circuit comprising:

a unidirectional counting register adapted to receive electrical pulses and to provide an indication of the number received;

first and second sources of electrical pulses;

control signal providing means comprising first, second and third control flip-flops and a plurality of AND and OR gates coupled to said flip-flops, said AND and OR gates coupled to said pulse sources and responsive to pulses therefrom for controlling said control flip-flops;

and a control element coupled to said register and to one of said pulse sources for inhibiting the passage of pulses from said one pulse source to said register, said control element being coupled to said first, second and third control flip-flops of said control signal providing means and adapted to receive control signals therefrom.

10. A counter circuit comprising:

a counter, said counter being responsive to receive electrical signals and to provide an indication of the number of signals received;

a first and second source of electrical pulses; a first flip-flop and a second flip-flop, each having a true input circuit for providing a true output signal and a false output circuit for providing a false output signal;

a gate, said gate being responsive to the true output signals of said first and said second flip-flops and to one of said sources of electrical signals; and logic means coupled between said first and said second sources of electrical signals and the true and false output circuits of said first and said second flip-flops and said gates for inhibiting the passage of signals of the other source of said first and said second source of electrical signals.

11. The counter circuit as defined in claim 10 and further including means for storing electrical signals from one of said first and said second sources of electrical signals, said means including means for reducing the contents of said storage means when a signal of the other of said first and said second sources of electrical signals is in a predetermined state.

12. The counter circuit as defined in claim 10 wherein said logic means includes:

at least three OR gates intercoupled with said first flip-flop and said second flip-flop;

one of said OR gates being enable by said first pulse source and being coupled to said first flip-flop; and one of said other OR gates being coupled to said second flip-flop for setting said second flip-flop in a true position and being enabled by said first or said second source and the other of said OR gates being enabled by said second source or the false output of said second flip-flop and said second pulse source.

13. The counter circuit as defined in claim 12 wherein said logic means further includes a further AND gate coupled to said other of said OR gate and being enabled by said second pulse source and the false output of said second flip-flop.

14. In apparatus for detecting whether a mechanical element has moved one or more position increments beyond a predetermined position on a machine axis;

a scale pulse source counter means for providing a first count pulse for each increment of movement of the mechanical element on said machine axis in a first direction and for providing a second count pulse for each increment of movement of the mechanical element in said machine axis in a second direction;

a countdown counter means for registering a count of the desired position of said mechanical element on said machine axis and being capable of counting down by count pulses from said scale pulse source counter means; and logic means for controlling said countdown counter and for causing the storage of a first count pulse or a second count pulse depending upon the direction of travel of the mechanical element on said machine axis.

15. In the apparatus as defined in claim 14, said logic means further comprising a directional flip-flop circuit means for storing a signal indicating the direction of movement of the mechanical element of said machine axis, said direction flip-flop circuit means being set in a first state by a movement of the mechanical element on said machine axis in a first direction and set in a second state by the movement of the mechanical element on said machine axis in a second direction.

16. In the apparatus as defined in claim 14, said logic means further comprising a sign flip-flop circuit means for indicating whether the sign of the pulse provided by said scale counter means is a first count pulse or a second count pulse, said sign flip-flop being responsive to the output pulses of said scale counter means.

17. In the apparatus as defined in claim 14, said logic means further comprising:

a directional flip-flop circuit means for storing a signal indicating the direction of movement of the mechanical element on said machine axis, said directional flip-flop circuit means being set in a first state by the movement of the mechanical element on said machine axis in a first direction and set in a second state by the movement of the mechanical element on said machine axis in a second direction; and a sign flip-flop circuit means for indicating whether the sign of the pulses provided by said scale counter means is a first count pulse or a second count pulse, said sign flip-flop being responsive to the output pulses of said scale counter means.

18. In the apparatus as defined in claim 14, wherein said logic means further comprises an overshoot flip-flop circuit means for indicating whether the mechanical element has moved out of a predetermined limit of said machine axis upon the occurrence of said first count pulse or said second count pulse of said scale counter pulse source means to indicate increments of movement of the mechanical element on said machine axis.

19. In the apparatus as defined in claim 14, said logic means further comprising:

a directional flip-flop circuit means for storing a signal indicating the direction of movement of the mechanical element on said machine axis, said directional flip-flop circuit means being set in a first state by a movement of the mechanical element on said machine axis in a first direction and set in a second state by the movement of the mechanical element on said machine axis in a second direction; and an overshoot flip-flop circuit means for indicating whether the mechanical element has moved out of a predetermined limit of said machine axis upon the occurrence of said first count pulse or said second count pulse of said scale counter pulse source means to indicate increments of movement of the mechanical element on said machine axis.

20. In the apparatus as defined in claim 14, said logic means further comprising:
- a sign flip-flop circuit means for indicating whether the sign of the pulse provided by said scale counter means is a first count pulse or a second count pulse, said sign flip-flop being responsive to the output pulses of said scale counter means; and
- an overshoot flip-flop circuit means for indicating whether the mechanical movement has moved out of a predetermined limit of said machine axis upon the occurrence of said first count pulse or said second count pulse of said scale counter pulse source means to indicate increments of movement of the mechanical element on said machine axis.

21. In the apparatus as defined in claim 14, said logic means further comprising:
- a directional flip-flop circuit means for storing a signal indicating the direction of movement of the mechanical element on said machine axis, said direction flip-flop circuit means being set in a first state by a movement of said machine axis in a first direction and set in a second state by the movement of the mechanical element on said machine axis in a second state;
- a sign flip-flop circuit means for indicating whether the sign of the pulse provided by said scale counter means is a first count pulse or a second count pulse, said sign flip-flop being responsive to the output pulses of said scale counter means; and
- an overshoot flip flop circuit means for indicating whether the mechanical element has moved out of a predetermined limit of said machine axis upon the occurrence of said first count pulse or said second count pulse of said scale counter pulse source means to indicate increments of movement of the mechanical element on said machine axis.

22. In the apparatus as defined in claim 21 wherein said countdown counter being controlled by said overshoot flip-flop, said sign flip-flop and said directional flip-flop to be counted down by pulses indicative of pulse sources of a first state or a second state from all said flip-flops.

23. In the apparatus as defined in claim 21 wherein said overshoot flip-flop being additionally controlled by said countdown counter and said control pulses provided by said directional and said sign flip-flops and being capable of being switched to their false states when said counter has counted down past a predetermined minimum count.

24. In the apparatus as defined in claim 21 wherein:
- said countdown counter being controlled by said overshoot flip-flop, said sign flip-flop and said directional flip flop to be counted down by pulses indicative of pulse sources of a first state or a second state from all said flip-flops; and
- said overshoot flip flop being additionally controlled by said countdown counter and said control pulses provided by said directional and said sign flip-flops and being capable of being switched to their false states when said counter has counted down past a predetermined minimum count.

References Cited

UNITED STATES PATENTS 3,073,522  1/1963  Bockemuehl _____ 235—92

MAYNARD R. WILBUR, *Primary Examiner.*

G. J. MAIER, *Assistant Examiner.*

PO-1050
(5/69)

UNITED STATES PATENT OFFICE
CERTIFICATE OF CORRECTION

Patent No. 3,414,718        Dated December 3, 1968

Inventor(s) M. R. McElroy

It is certified that error appears in the above-identified patent and that said Letters Patent are hereby corrected as shown below:

Column 2, line 4, "undirec-" should be --unidirec---;

" 2, " 70, delete "machines" and insert --machine--;

" 3, " 1, after "total" insert --move--;

" 3, " 72, after "false" insert closing quotes (");

" 4, " 14, delete "the", first occurrence;

" 7, " 61, "$N_n$" should be --$N_p$--;

" 9, " 60, Fourth Equation: delete the period (.) after "$P_p$";

" 11, " 31, "cource" should be --source--;

" 11, " 33, "as" should be --are--;

" 13, " 18, after "number" insert --of pulses--;

" 13, " 63, "enable" should be --enabled--;

" 14, " 23, "of", second occurrence, should be --on--.

Signed and sealed this 4th day of January 1972.

(SEAL)
Attest:

EDWARD M. FLETCHER, JR.
Attesting Officer

ROBERT GOTTSCHALK
Acting Commissioner of Patents